April 13, 1965   F. H. PENNELL   3,177,563
METHOD OF TREATING GEARS AND THE LIKE
Filed June 28, 1960

INVENTOR.
FRANKLIN H. PENNELL
BY
Busser, Smith & Harding

ATTORNEYS

United States Patent Office 3,177,563
Patented Apr. 13, 1965

3,177,563
METHOD OF TREATING GEARS AND THE LIKE
Franklin H. Pennell, Ivyland, Pa., assignor, by mesne assignments, to De Laval Turbine Inc., Trenton, N.J., a corporation of Delaware
Filed June 28, 1960, Ser. No. 39,332
7 Claims. (Cl. 29—159.2)

This invention relates to a method of treating gears and the like and more particularly a method for carburizing and hardening steel gears and the like.

The prior method of hardening steel gears and other similar machined steel products involves the sequential steps of carburizing to the desired case depth, annealing, if necessary, to a good machinability and a rough machining operation. The solid gear body is then heat treated to produce the desired gear hardness by heating and quenching steps. This is followed by a low temperature tempering operation and a final grinding operation.

This prior method has several disadvantages. In the first place, since a solid gear element of substantial volume is heated and quenched in the hardening step, there is a large amount of distortion due to cooling of this solid gear. This distortion in the case of the larger diameter gears, which may be larger than 20 inches in diameter, is so large that it may not be corrected by the subsequent grinding operation. It is apparent that the distortion increases with the gear size. While the subsequent grinding operation tends to correct the distortion created by the heat treating step, this is not a satisfactory method of correction. In the larger diameter gears for example, gear distortion may be so great that the grinding required is so extensive that the entire case will be removed from some areas. Furthermore, large distortion may cause undesired non-uniform stress relief within the gear. Another disadvantage of extensive grinding is that this results in the waste of valuable alloy steel.

It is an object of this invention to carburize and harden gears and the like by a method which avoids distortion and its accompanying problems.

Another object of this invention is to heat treat gears and the like by a method which minimizes the amount of stock removal required to place the gear in the desired shape.

Briefly stated, the procedure in accordance with this invention involves carburizing a ring having the gear teeth machined thereon almost to final dimensions, attaching the gear ring in a heated condition to a gear center and then quenching the assembled gear to produce the desired gear hardness. By employing a relatively thin gear ring, there will be a minimum distortion since there is a minimum volume of material. Moreover, the center serves to insure that the gear ring will have the desired roundness. Also, the carburized gear ring is placed on the center in the carburized and heated condition and thus goes through its transformation, hardening and shrinking while on the gear center. By reason of the method in accordance with this invention, it is possible to minimize the need for grinding after the carburizing and heat treating step since there is a minimum of distortion. Also, the method in accordance with this invention does not require any reheating after the carburizing step for the purpose of hardness treatment since the gear is quenched immediately after removal from the carburizing furnace.

The above and other objects and features of the invention will become apparent from a consideration of the following description taken in connection with the accompanying drawing, wherein.

The material from which the gears are to be made is preferably a nickel-chromium or nickel-chromium-molybdenum carburizing steel comprising basic carbon of approximately 0.20 percent, nickel between 1.50 to 4.00 percent, chromium of 1.25 percent maximum, molybdenum of .15 to .40 percent. This material should have a grain size of 5 or finer by McQuaid-Ehn test, ASTM E19–46.

The first step in the method in accordance with this invention is to forge the steel into the shape of a ring having an outer diameter slightly greater than the desired finally machined gear outer diameter and an inner diameter slightly less than the finally machined ring inner diameter. The forged ring is then normalized from 1700° F., tempered at 1200° F. and slowly cooled in the heat treating furnace at a rate not faster than 100° F. per hour until the temperature reaches 400° F. at which time the furnace may be discharged. This serves to stress relieve the ring and cause the desired crystalline structure to be formed.

The next step is to finish machine the gear ring including the cutting of the teeth in the ring and the machining of the bore to be concentric with the gear pitch line. The bore diameter is a predetermined size which will produce a final shrink stress of approximately 5000 p.s.i. when placed on the gear center as will be hereinafter described. The bore diameter will depend on the size of the center diameter and the volume changes of the gear ring due to crystalline transformation in response to the heat treatment thereof. The bore diameter is determined by experimentally taking into account the crystalline transformation. For example, for a 22 inch center diameter, a bore diameter of 21.987 inches will produce a shrink stress of approximately 5,000 p.s.i. after the gear ring has been placed on the center in accordance with the heat treating procedure involved in this invention. The bore diameter is less than the center diameter by approximately .0005 inch per inch of diameter. The stress of 5,000 p.s.i. will be sufficient to prevent slippage between the gear ring and gear center and to cause the ring to round out when placed on the gear center and thus remove any roundness distortion thereof caused in the heat treating.

In order to minimize the distortion, it is essential that the radial thickness of the gear ring 10 be as small as possible. As a rule of thumb, the total thickness of the ring including the teeth should be approximately five times the height of the gear teeth to be cut. While a thickness of five times the height of the teeth has been found to provide satisfactory results, a thickness of three times the height of the teeth is the minimum dimension.

Figure 1:
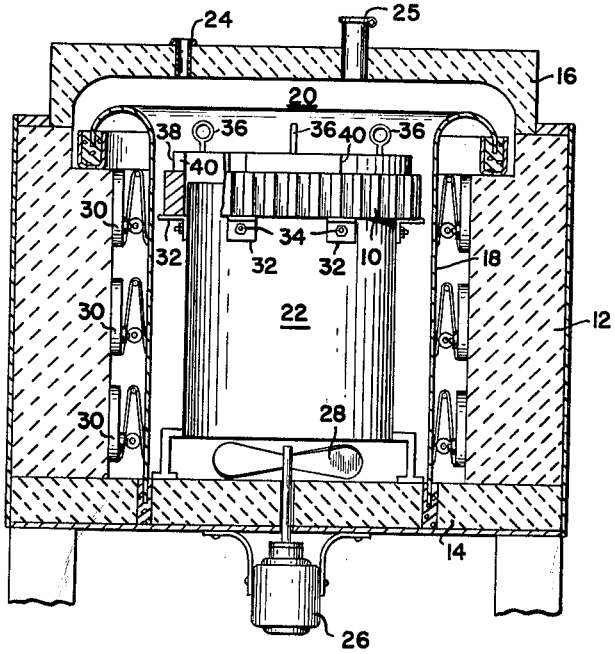
FIGURE 1 is a sectional view of a carburizing furnace containing the gear ring in accordance with this invention.

The gear ring 10 is then carburized in a suitable carburizing furnace such as that illustrated in FIGURE 1 and comprises a cylindrical wall 12, a bottom 14 and a removable lid 16 all of refractory material. A cylindrical retort 18 is supported within the furnace and cooperates with the lid 16 and the bottom 14 to define a carburizing chamber 20 within the furnace. Supported within the chamber 20 is an open ended, vertically extending cylindrical baffle 22. An inlet fitting 24 is mounted in lid 16 and serves as an inlet for the carburizing fluid. Lid 16 also has a vent 25.

A fan 26 is supported on the bottom 14 with the fan blades 28 positioned beneath the open bottom end of baffle 22. The fan 26 serves to circulate the carburizing gas which will be drawn downwardly through the upper end of baffle 22 and pass upwardly between the exterior of baffle 22 and retort 18. A plurality of heating elements 30, in the form of an undulated ribbon of nickel-chrome alloy, are suspended from supports embedded in the wall 12. The heating elements 30 maintain the desired furnace temperature.

The gear ring 10 is supported within the carburizing chamber 20 in a horizontal position by means of a plurality of supports 32 secured to the exterior of baffle 22 as by bolts 34. Supports 32 provide a horizontal supporting area for the gear 10 and are made of a suitable heat resistant alloy such as Inconel. It will be apparent that any form of supporting fixture for the gear ring 10 may be provided. However, it is advantageous that the gear ring 10 is supported on a horizontal area on its side so as to minimize the possibility of distortion due to the weight of the gear ring. For example, if the gear ring 10 were supported in a vertical position, when the temperature is raised the gear ring will tend to distort along a vertical axis because of its weight.

The gear ring 10 has a plurality of eyebolts 36 threaded into a reduced diameter portion 38 extending from a side thereof. Reduced diameter portion 38 may have a plurality of slots 40 therein to permit free expansion and contraction thereof. Eyebolts 36 are made of a suitable heat resistant material such as Inconel. Eyebolts 36 are engageable by a suitable transporting means for moving the gear ring 10 as desired, for example, into and out of the furnace. One form of transporting means is indicated at 42 in FIGURE 2 and comprises a plurality of arms 44 having hooks at the lower ends thereof engageable with the eyebolts 36.

The carburizing procedure comprises raising the furnace temperature to approximately 1500° F. at which temperature the gear ring 10 is placed on the supports 32 in the position shown in FIGURE 1. The carburizing gas is initially added at a relatively low rate. However, when the furnace temperature reaches 1700° F., the carburizing temperature, the feed of the carburizing gas is increased. When it is desired to provide a case depth of .05 to .06 inch, this feed rate and temperature are maintained for approximately two hours. The carburizing fluid is then shut off while the carburizing temperature of 1700° F. is maintained for approximately four hours. The carburizing temperature is maintained until the desired case depth of .05 to .06 inch is attained. The case depth may be tested during the carburizing procedure by removing test pins from the furnace through the vent 25, which test pins are broken and the case depth thereof is measured.

The carburizing gas comprises a fluid which cracks in the furnace to form a gas having a chemically constant carbon content to thereby provide a carbonaceous atmosphere within the furnace. It is important that the gas be chemically constant so that the procedure may be duplicated with the same results.

After the desired case depth is reached, the furnace controller is reset to 1500° F. When the furnace and gear temperatures are equalized at 1500° F. the gear is ready for quenching. The furnace vent 25 is opened to permit burning off of the excess gas within the furnace. The lid 16 is then removed. The gear ring 10 is then lifted by the transporting means 42, removed from the furnace and immediately placed in its heated condition onto the gear center 46 in the manner illustrated in FIGURE 2. The gear center 46 has a cylindrical portion 48 adapted to receive the gear ring 10 and a shoulder 50 adjacent portion 48 for axially positioning the gear ring 10. Shoulder 50 also serves to support the gear ring in its heated condition. The diameter and concentricity of portion 48 are accurately machined and will thus serve to round out the gear ring 10 as it cools on the gear center 46 and to provide the desired shrink stress.

The openings in eyebolts 36 and the hooks of arms 44 extend in approximately a tangential direction with respect to the gear ring 10. Moreover, the hooks of the arms 44 extend at approximately right angles to the arms 44 and project into the openings of eyebolts 36 from the same relative sides thereof. Thus, the transporting means 42 is disengageable from eyebolts 36 by rotation of the arms 44 to cause the hooks thereof to move out of the openings in the eyebolts 36. The transporting means 42 is, of course, vertically positioned to avoid frictional contact between the hooks and the eyebolts 36 before the arms 44 are rotated away from the eyebolts 36 to effect disengagement. The transporting means 42 is disengaged from the eyebolts 36 after the ring 10 is assembled onto center 46.

After the gear ring 10 has been positioned on the center 46, the assembly is immediately quenched in an oil bath to provide the necessary hardness. The assembly is left in the oil bath until the temperature of this assembly is below 200° F.

Figure 2:
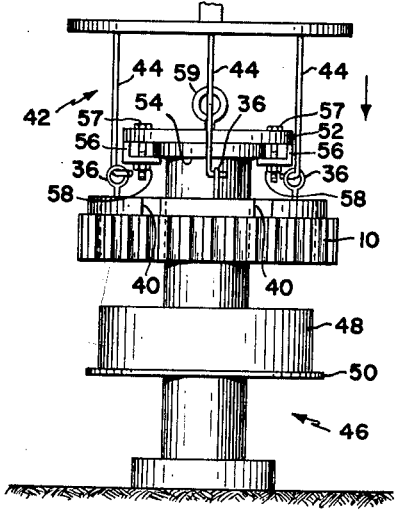
FIGURE 2 is an elevational view illustrating a step in the method in accordance with this invention.
Figure 3:
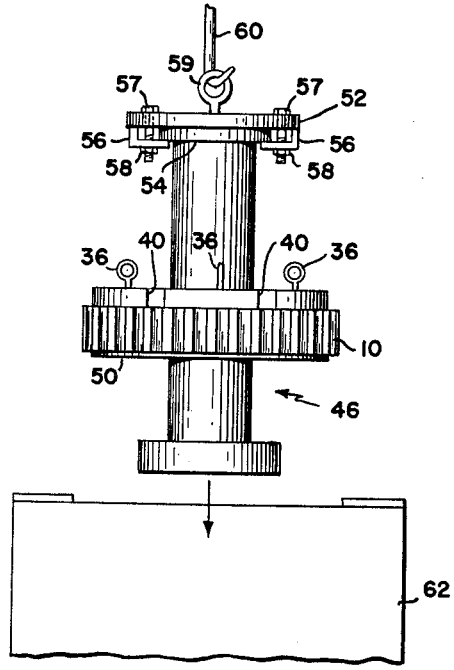
FIGURE 3 is an elevational view illustrating a subsequent step in the method in accordance with this invention.

One form of apparatus for quenching the assembled gear ring 10 and gear center 46 is shown in FIGURES 2 and 3 and comprises a support member 52 adapted to be clamped onto an annular shoulder 54 at the upper end of center 46 by means of clamps 56. Clamps 56 are carried by member 52 by means of bolts 57 which extend through openings in member 52 and clamps 56 to threadedly engage nuts 58. Support member 52 has an eyebolt 59 which is engageable by transporting means 60 for lifting the assembled gear ring 10 and gear center 46 and lowering the same into a quench tank 62. The support member 52 is clamped onto center 46 before the carburized gear ring 10 is assembled thereon as is shown in FIGURE 2. The outer diameter of support member 52 is smaller than the inner diameter of the gear ring 10 to permit the latter to clear support member 52 when assembled onto center 46.

It will be apparent that by placing the gear ring 10 on the gear center 46 immediately after removal from the carburizing furnace whereby the gear ring temperature will be approximately 1500° F., the gear ring 10 is still in its austenitic and expanded condition. Thus, when the assembled gear ring 10 and gear center 46 are quenched, the gear ring goes through its transformation, its hardening and its shrinking in this assembled position on the gear center 46. This immediate quenching quickly cools the gear ring 10 to thereby avoid any distortion problems resulting from the differential temperatures of the gear ring 10 and the gear center 46.

The gear center 46 serves to restrict any distortion of the gear ring 10 as it transforms, shrinks and hardens since the gear center 46 is at a low temperature and does not change its shape. Also, since the gear ring 10 is relatively thin and has a small volume, the tendency for distortion is minimized. There is no need for correcting any distortion by a subsequent machining operation since the gear ring 10 is still in the same shape as it was prior to the carburizing and hardening operations. Thus, in the method in accordance with this invention, there is no need for machining operation subsequent to the carburizing step, which machining operation would involve removing some of the case hardened portion of gear.

The final heat treatment is to temper the gear assembly at 375° F. for two hours. This serves to relieve the internal stresses in the gear ring 10.

The gear may then be finally ground. However, this grinding of the hardened and tempered gear will remove only very little of the case hardened exterior because there will be a minimum of distortion with the procedure in accordance with this invention.

It will be apparent that various modifications may be made in the method and apparatus in accordance with this invention without departing from the scope thereof wherefore it is not desired to be limited except as required by the following claims.

What is claimed is:

1. The method of manufacturing steel gears comprising the sequential steps of forming a gear ring, machining the gear teeth and internal diameter of said gear ring, placing the gear ring in a carburizing furnace to rest in a substantially horizontal position on a side edge thereof, whereby the possibility of distortion due to the weight of the rim at the carburization temperature of the furnace is minimized, carburizing said gear ring, removing said gear ring from said carburizing furnace and immediately assembling the same on a gear center, and quenching said assembled ring and center immediately after the assembly thereof to harden said gear ring, said ring cooling, shrinking and transforming while assembled on said center.

2. A method as claimed in claim 1 wherein the internal diameter of said gear ring is concentric with the pitch diameter of the gear teeth, the diameter of said center at room temperature being slightly greater than said ring internal diameter at room temperature and slightly less than the ring internal diameter at said carburizing temperature whereby when said ring shrinks on said center, a shrinking stress is produced.

3. A method as claimed in claim 1 wherein in the step of placing said gear ring in said carburizing furnace, said gear ring is supported by heat resistant eyebolts connected to said gear ring, and heat resistant means provide a horizontal supporting area within said furnace for said gear ring.

4. The method as claimed in claim 1 wherein said carburizing temperature is such that said ring member is quenched while in an austenitic condition.

5. The method of manufacturing gears comprising the sequential steps of forging a gear ring, normalizing and tempering said forged ring, machining the gear teeth in said gear ring, carburizing said gear ring at a temperature placing the same in an austenitic condition, assembling said gear ring in said austenitic condition onto a gear center, and immediately quenching said assembled gear ring and said gear center to harden said gear ring, said gear ring cooling, shrinking and transforming while assembled on said gear center.

6. The method as claimed in claim 5 including the step of tempering said hardened gear to relieve the internal stresses therein.

7. The method of manufacturing gears comprising the sequential steps of forming a gear ring, machining the gear teeth in said ring, the thickness of said gear ring being approximately five times the height of the gear teeth, carburizing said gear ring at the temperature placing the same in an austenitic condition, assembling said gear ring in austenitic condition onto a gear center, quenching said assembled gear ring and said gear center to harden said gear ring, said gear ring cooling, shrinking and transforming while assembled on said gear center.

References Cited by the Examiner
UNITED STATES PATENTS

| | | |
|---|---|---|
| 784,544 | 3/05 | Brinton. |
| 926,898 | 7/09 | Rockwell _____ 29—447 X |
| 1,305,050 | 5/19 | Beall. |
| 1,338,672 | 5/20 | Calkins _____ 74—41 |
| 1,597,340 | 8/26 | Best. |
| 2,197,039 | 4/40 | Gottlieb _____ 148—15.5 |
| 2,302,229 | 11/42 | Lampton. |
| 2,335,295 | 11/43 | Millard _____ 29—159.2 X |
| 2,756,607 | 7/56 | Mochel et al. _____ 29—159.2 X |

FOREIGN PATENTS

| | | |
|---|---|---|
| 460,872 | 11/49 | Canada. |
| 475,244 | 11/37 | Great Britain. |

OTHER REFERENCES

"Heating for Shrink-Fitting," Metals Handbook, 1948 edition, the American Society of Metals, Cleveland, Ohio, page 283.

WHITMORE A. WILTZ, *Primary Examiner.*
NEDWIN BERGER, HYLAND BIZOT, *Examiners.*